United States Patent [19]

Oshizawa

[11] Patent Number: 4,974,776
[45] Date of Patent: Dec. 4, 1990

[54] APPARATUS FOR CONTROLLING AIR-MIX DOOR IN AUTOMOBILE AIR-CONDITIONERS

[75] Inventor: Hidekazu Oshizawa, Higashi-matsuyama, Japan

[73] Assignee: Diesel Kiki Co., Ltd., Tokyo, Japan

[21] Appl. No.: 361,863

[22] Filed: Jun. 6, 1989

[30] Foreign Application Priority Data

Jul. 4, 1988 [JP] Japan .................. 63-166091

[51] Int. Cl.$^5$ ............................................ G05D 23/00
[52] U.S. Cl. ...................................... 236/13; 62/186; 165/43
[58] Field of Search .............. 236/13; 165/43; 62/179, 62/186

[56] References Cited

U.S. PATENT DOCUMENTS 4,832,258 5/1989 Hoshino et al. .................. 236/13

FOREIGN PATENT DOCUMENTS 0071618 6/1981 Japan .................................. 236/13
0077215 5/1982 Japan .................................. 236/13

Primary Examiner—William E. Wayner
Attorney, Agent, or Firm—Wenderoth, Lind & Ponack

[57] ABSTRACT

An air-mix door control apparatus for automobile air-conditioners which is so constructed as to control the position of the air-mix door according to a deviation of the actual discharge air temperature from a target discharge air temperature calculated based on a set temperature, a vehicle compartment temperature, etc. A target position for the air-mix door is calculated according to a difference between the target discharge air temperature and the actual discharge air temperature at an interval which is shorter than the interval of calculation of the difference between the target air temperature and the actual discharge air temperature. With the control apparatus thus constructed, a stable and reliable control of operation of the air-mix can be achieved.

3 Claims, 4 Drawing Sheets

APPARATUS FOR CONTROLLING AIR-MIX DOOR IN AUTOMOBILE AIR-CONDITIONERS

BACKGROUND OF THE INVENTION

1. Field of the Invention:

The present invention relates to an apparatus for controlling an air-mix door in an automobile air-conditioner.

2. Description of the Prior Art:

There are known various apparatus for controlling an air-mix door in an automobile air-conditioner to condition air at a temperature coincident with a desired target value before the air is discharged from an outlet of the air-conditioner. One such known air mix door control apparatus includes, as shown here in FIG. 4, target discharge air temperature calculation means 200 for calculating a target discharge air temperature based on a set temperature, a vehicle compartment temperature and an outside air temperature, actual discharge air temperature calculation means 800 for calculating an actual discharge air temperature being discharged from an outlet based on a temperature of air detected by a mode sensor 25 at a position downstream of an evaporator 8 and an output from a position sensor 100 for detecting the position of an air-mix door 12, comparator means 600 for comparing the target discharge air temperature with the actual discharge air temperature, and drive control means 700 for actuating the air-mix door 12 according to a result of comparison by the comparator means 600.

With this construction, the actual discharge air temperature is fed back to the comparator means for comparison with the target discharge air temperature. Since the response speed of the actual discharge air temperature is very low, the air-mix door 12 is controlled to move slowly in harmony with a change in the actual discharge air temperature and hence is likely to cause hunting. A stable control of the air-mix door 12 is therefore difficult to achieve.

SUMMARY OF THE INVENTION

With the foregoing difficulties in view, an object of the present invention is to provide an apparatus capable of stably controlling an air-mix door in an automobile air-conditioner.

According to the present invention, there is provided an apparatus for controlling an air-mix door in an automobile air-conditioner, comprising: position detection means for detecting a position of the air-mix door; target discharge air temperature calculation means for calculating a target discharge air temperature; actual discharge air temperature acquirement means for acquiring an actual discharge air temperature; discharge air temperature difference calculation means for calculating the difference between the target discharge air temperature calculated by said target discharge air temperature calculation means and the actual discharge air temperature acquired by said actual discharge air temperature acquirement means at a predetermined first interval of time; target door-position calculation means for calculating a target position of the air-mix door at a predetermined second interval of time shorter than said first interval of time, by adding an increment determined based on a temperature difference calculated by said discharge air temperature difference calculation means to the target position obtained by a preceding calculation; comparator means for comparing an output from said position detection means and an output from said target door-position calculation means; and drive control means for controlling operation of the air-mix door according to a result of comparison by said comparator means.

With this construction, the calculation of the difference between the target discharge air temperature and the actual discharge air temperature is achieved slowly at the first predetermined intervals of time. However, since the thus-calculated temperature difference is used as an increment to vary the target position of the air-mix door, the control of operation of the air-mix door can be achieved speedily regardless of the speed of change in the actual discharge air temperature. Accordingly, an objectionable hunting of the air-mix door can be avoided.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION

The present invention will be described herein below in greater detail with reference to a preferred embodiment shown in the accompanying drawings.

Figure 1:
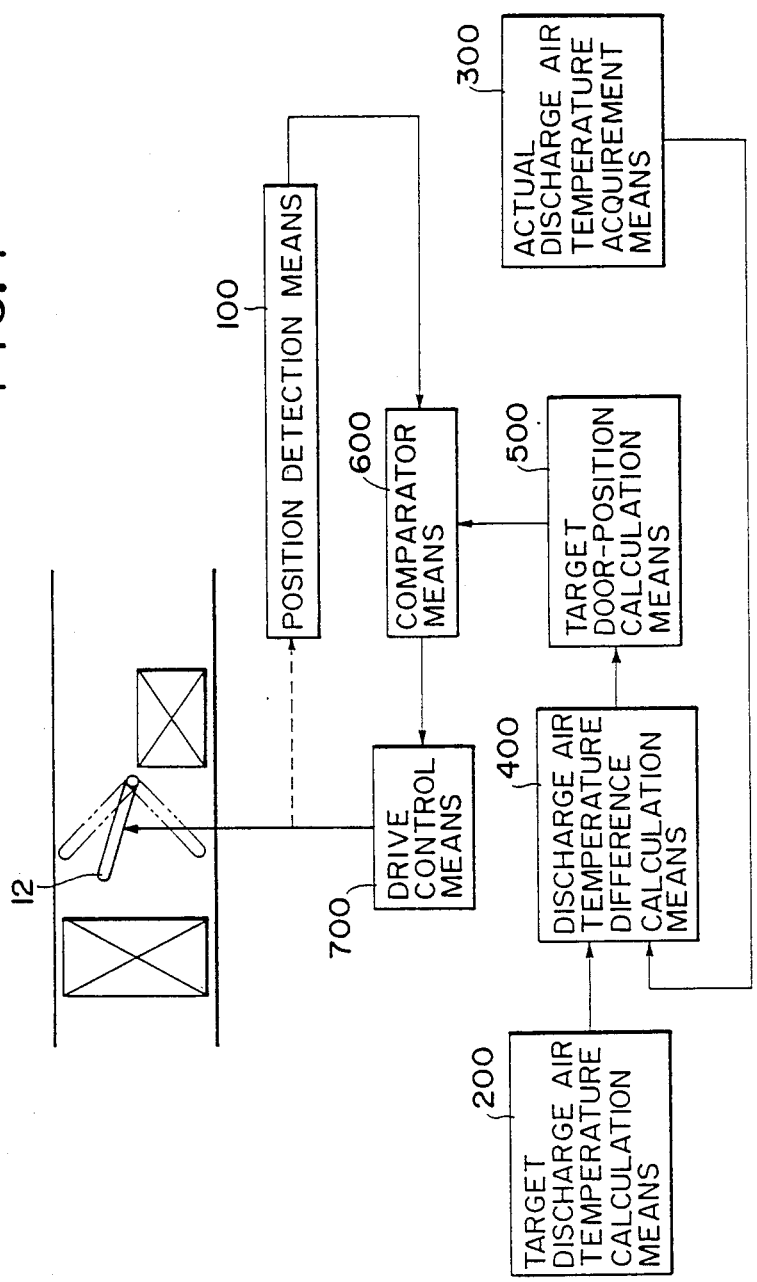
FIG. 1 is a block diagram showing the general construction of a control apparatus for an air-mix door in an automobile air-conditioner according to the present invention.

As shown in FIG. 1, an apparatus for controlling an air-mix door 12 in an automobile air-conditioner according to the present invention generally includes position detection means 100 for detecting a position of the air-mix door 12, target discharge air temperature calculation means 200 for calculating a target discharge air temperature, actual discharge air temperature acquirement means 300 for acquiring an actual discharge air temperature, discharge air temperature difference calculation means 400 for calculating the difference between the target discharge air temperature calculated by the target discharge air temperature calculation means 200 and the actual discharge air temperature acquired by the actual discharge air temperature acquirement means 300 at first predetermined intervals of time, target door-position calculation means 500 for calculating a target position of the air-mix door 12 at second predetermined intervals of time shorter than said first predetermined interval of time while an increment determined depending on a temperature difference calculated by the discharge air temperature difference calculation means 400 is added to the target position obtained by a preceding calculation, comparator means 600 for comparing an output from the position detection means 100 and an output from the target door-position calculation means 500, and drive control means 700 for controlling operation of the air-mix door 12 according to a result of comparison by the comparator means 600.

The structural details of the air-mix door control apparatus will be described below with reference to FIG. 2.

Figure 2:
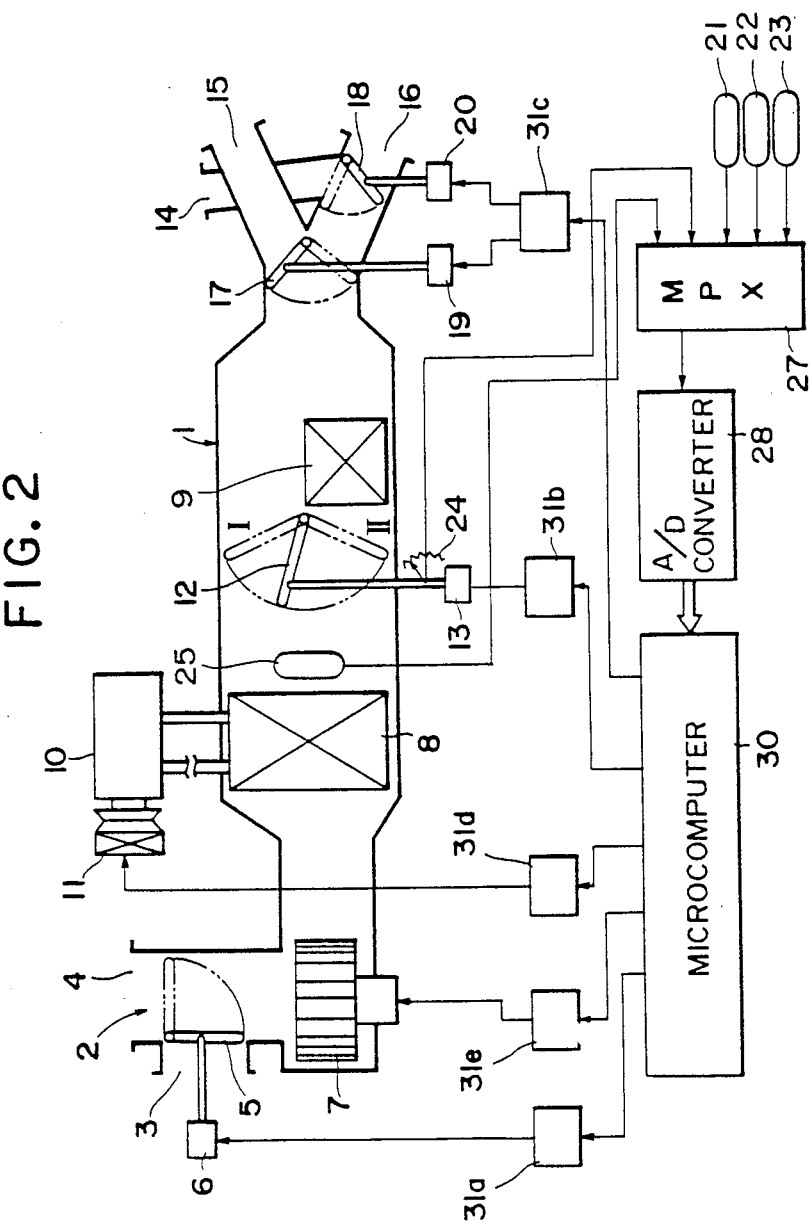
FIG. 2 is a diagrammatical view illustrative of the structural details of the automobile air-conditioner incorporating the air-mix door control apparatus according to the present invention.

As shown in FIG. 2, the automobile air-conditioner incorporating the control apparatus includes an air-flow duct 1 having an intake door changeover device 2 at the upstream end thereof. The intake door changeover device 2 includes a selecting door 5 disposed at the junction between a recirculated air inlet 3 and an outside air inlet 4 that are provided in bifurcated fashion. The selecting door 5 is operatively connected to an actuator 6 and driven by the latter to select one of the inlets 3, 4 for allowing the recirculated air or the outside air to be drawn into the duct 1.

A blower 7 is disposed in the duct 1 immediately downstream of the changeover device 2 to force the air to flow downstream through the duct 1. The duct 1 also includes the evaporator 8 and a heater core 9 disposed downstream of the blower 7 in the order named.

The evaporator 8 is connected in fluid circuit with a compressor 10 and non-illustrated components so as to constitute a refrigeration cycle or system. The compressor 10 includes an electromagnetic clutch 11 for selectively connecting the compressor 10 with an engine, not shown, of a motor vehicle. The electromagnetic clutch 11 is engaged and disengaged to undertake an on off control of operation of the compressor 10. The heater core 9 serves to heat the air passing therearound by transmitting heat to the air from an engine cooling water recirculating through the heater core 9. An air-mix door 12 is disposed between the evaporator 8 and the heater core 9 and operatively connected to an actuator 13. The position of the air-mix door 12 is regulated by the actuator 13 for adjustably varying the ratio of the amount of air flowing directly through the heater core 9 to the amount of air bypassing the heater core 9, so that the temperature of air to be discharged or blown-off from the duct 1 is controlled at a desired value.

The duct 1 has at its downstream end a defroster outlet 14, a vent outlet 15 and a heat outlet 16 that are provided in branched fashion and all open to a vehicle compartment. Two mode doors 17, 18 are disposed adjacent to the junction between the outlets 15, 16 and the junction between the outlets 14, 16, respectively, to open and close the respective outlets 14–16. The mode doors 17, 18 are drivably connected with a pair of actuators 19, 20, respectively, for selecting a desired discharge mode of the air-conditioner.

Designated by 21 is a temperature setter for setting a temperature $T_D$ in the vehicle compartment, 22 a vehicle compartment temperature sensor for detecting a temperature $T_R$ in the vehicle compartment, 23 an outside air temperature sensor for detecting a temperature $T_A$ of air outside the vehicle compartment, 24 a position sensor for detecting a position $X_P$ of the air-mix door 12, and 25 a mode sensor disposed on or downstream of the evaporator 8 for detecting a temperature of the evaporator 8 or a temperature $T_E$ of air passing through the evaporator 8. The position sensor 24 constitutes the position detection means 100 stated above. Output signals from the temperature setter 21 and the respective sensors 22–25 are inputted through a multiplexer (MPX) 27 into an A/D converter 28 in the order selected by the multiplexer 27. After having been digitalized by the A/D converter 28, the output signals are supplied to a microcomputer 30.

The microcomputer 30 is of the conventional type known per se and comprises a central processing unit (CPU), a read only memory (ROM), a random access memory (RAM) and an input/output port (I/0), neither shown. The microcomputer 30 arithmetically processes the input signals stated above to produce control signals and then issues the control signals through respective driver circuits 31a–31e to the actuators 6, 13, 19, 20, the compressor 10 and a motor of the blower 7 for controlling the operation of the respective doors 5, 12, 17, 18, the on-off operation of the compressor 10 and the rotation of the blower motor.

Figure 3:
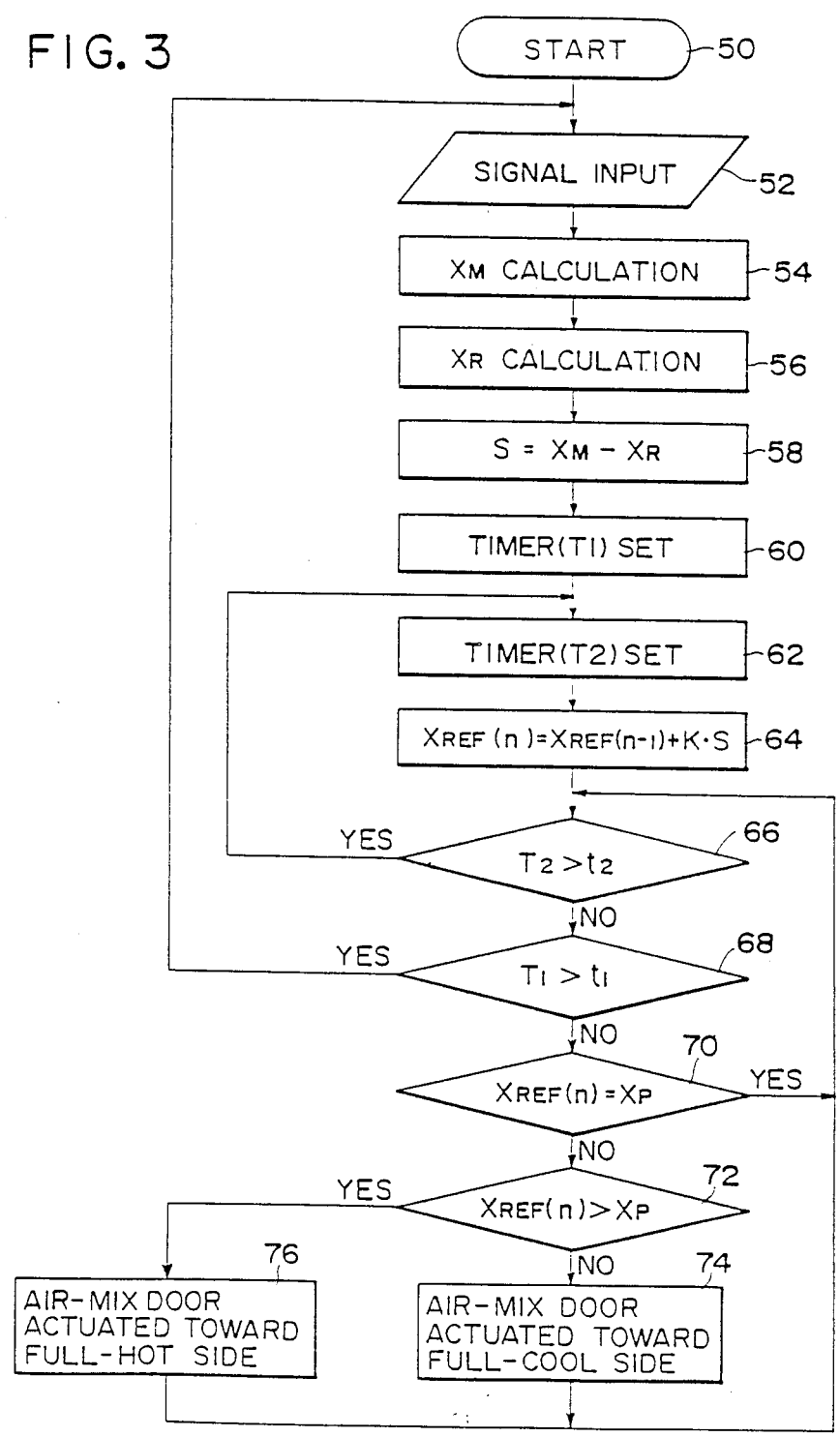
FIG. 3 is a flowchart showing a control routine achieved by a microcomputer in the control apparatus for controlling the operation of the air mix door of the air-conditioner.
Figure 4:
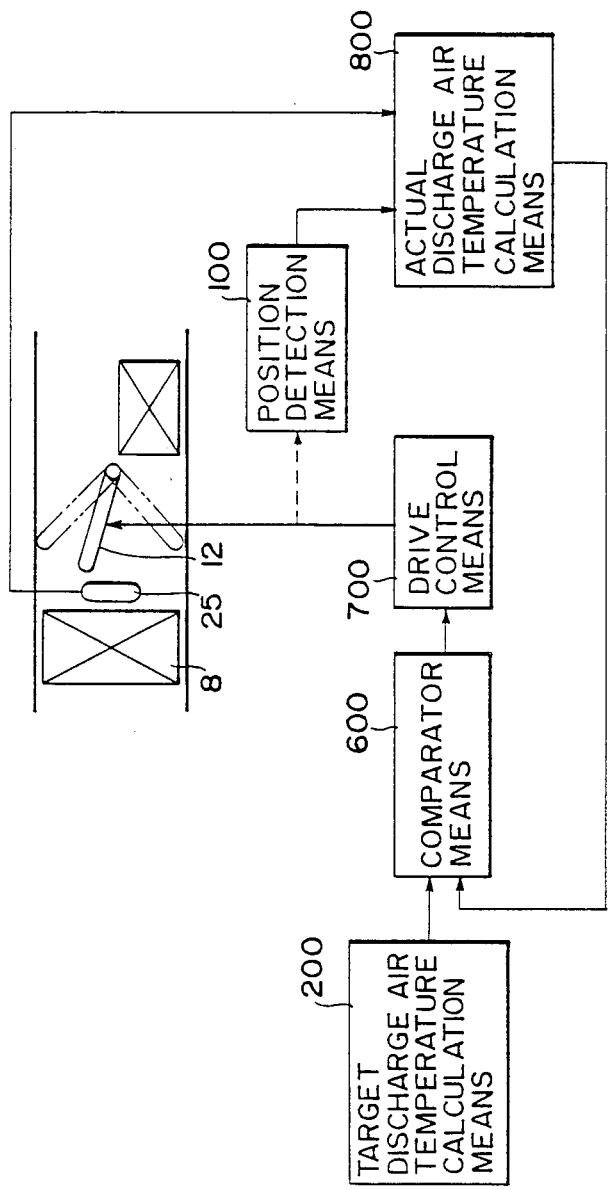
FIG. 4 is a block diagram showing the general construction of a conventional air-mix door control apparatus.

The operation of the microcomputer 30 will be described below with reference to a flowchart shown in FIG. 3 in which a control routine for the control of operation of the air-mix door 12 is illustrated.

When a non-illustrated main switch is closed, the control routine of the microcomputer 30 starts in a step 50 in accordance with a program stored in the microcomputer 30. In the next step 52, various signals $T_D$, $T_R$, $T_A$, $X_P$ and $T_E$ are inputted from the temperature setter 21 and the respective sensors 22–25 into the microcomputer 30.

Thereafter, the control goes to a step 54 in which a target discharge air temperature $X_M$ to be discharged from any of the outlets 14–16 is calculated based on the set temperature $T_D$, the vehicle compartment temperature $T_R$ and the outside air temperature $T_A$ in accordance with the following equation (1).

$$X_M = A \cdot T_D + B \cdot T_R + C \cdot T_A + D \tag{1}$$

where A, B, C and D are calculation constants. The target discharge air temperature $X_M$ may be obtained through a predetermined calculation achieved based on $T_D$ and a composite parameter which has been read out from a control map experimentally prepared depending on a correlation between $T_R$ and $T_A$.

In the next step 56, an actual temperature $X_R$ of air being discharged from the outlet is determined. The actual discharge air temperature $X_R$ may be obtained through a measurement by means of a temperature sensor disposed at the outlet. In the illustrated embodiment, however, $X_R$ is obtained by calculation based on a predetermined map which contains experimentally obtained data on the actual discharge air temperature as a function of the position $X_P$ of the air-mix door 12 and the output value $T_E$ from the mode sensor 25.

After $X_R$ is obtained in the step 56, the control goes to a step 58 in which the difference (S) between the target discharge air temperature $X_M$ and the actual discharge air temperature $X_R$ is obtained according to the following equation (2).

$$S = X_M - X_R \tag{2}$$

Thereafter, two timers T1 and T2 are set successively in steps 60 and 62 to start timing processes.

In the next step 64, a target door position $X_{REF(n)}$ for the air-mix door 12 is determined by summing up the target air-mix door position $X_{REF(n-1)}$ obtained in the preceding calculation process and a value which is proportional to the difference obtained in the step 64, in accordance with the following equation (3).

$$X_{REF(n)} = X_{REF(n-1)} + K \cdot S \tag{3}$$

where K is a calculation constant. The air-mix door 12 is moved to aproach its full-hot position as the $X_{REF(n)}$ becomes large.

The calculation in the step 64 is achieved each time when a predetermined period of time t2 (e.g. 4 m sec.) set in the timer T2 elapses in a step 66, so that the target door-position $X_{REF(n)}$ is represented by a value proportional to an integral of S and is renewed by the time period t2.

If the time period t2 in the timer T2 has not elapsed in the step 66, then the control goes to a step 68 for determining as to whether a predetermined period of time t1 set in the timer T1 has elapsed or not. The time period t1 is 100 m sec. for example and hence is longer than the time period t2 set in the timer T2. If the time period t1 has not elapsed, then the control proceeds to a step 70 for achieving a feedback control to actuate the air-mix door 12 until the door 12 assumes the target door-position $X_{REF(n)}$.

In the step 70, a judgment is made to determine whether a position $X_p$ of the air-mix door 12 detected by the position sensor 24 is coincident with the target door position $X_{REF(n)}$. If yes, then the control returns to the step 66 to maintain the current door position. If the detected air-mix door position $X_p$ deviates from the target door-position $X_{REF(n)}$, the control proceeds to a step 72 in which a comparison is made between $X_{REF(n)}$ and $X_p$. If the air-mix door 12 is displaced from the target door-position $X_{REF(n)}$ toward the full-hot side (the position indicated by I in FIG. 2), the control goes in a direction NO to a step 74 for actuating the air-mix door 12 toward the full-cool side, then returning to the step 66. Conversely, if the judgment indicates that the air-mix door 12 is displaced from the target door-position $X_{REF(n)}$ toward the full-cool side (the position indicated by II in FIG. 2), the control goes in a direction YES to a step 76 for actuating the air-mix door 12 to move toward the full-hot side, then returning to the step 66.

If judgment in the step 68 indicates that T1>ti (i.e., the time period t1 set in the timer T1 has elapsed), the control returns to the step 52 for again seek the difference S between the target discharge air temperature $X_M$ and the actual discharge air temperature $X_R$.

As appears clear from the foregoing description, the discharge air temperature difference S is calculated at relatively long interval of time t1 in harmony with a change in the actual discharge air temperature, however, the target door-position $X_{REF(n)}$ is renewed at relatively short interval of time t2. This enables that the air-mix door 12 is actuated rapidly in immediate response to the renewal of the target door-position until the discharge air temperature difference S is not present and hence the target door-position $X_{REF(n)}$ becomes equal to the preceding target door-position $X_{REF(n-1)}$. Thereafter, the air mix door 12 is maintained in the target door-position $X_{REF(n)}$.

Obviously, various modifications and variations of the present invention are possible in the light of the above teaching. It is therefore to be understood that within the scope of the appended claims the present invention may be practiced otherwise than as specifically described.

What is claimed is:

1. An apparatus for controlling an air-mix door in an automobile air-conditioner, comprising:
   (a) position detection means for detecting a position of the air-mix door;
   (b) target discharge air temperature calculation means for calculating a target discharge air temperature;
   (c) actual discharge air temperature acquirement means for acquiring an actual discharge air temperature;
   (d) discharge air temperature difference calculation means for calculating the difference between the target discharge air temperature calculated by said target discharge air temperature calculation means and the actual discharge air temperature acquired by said actual discharge air temperature acquirement means at a predetermined first interval of time;
   (e) target door-position calculation means for calculating a target position of the air-mix door at a predetermined second interval of time shorter than said first interval of time, by adding an increment determined based on a temperature difference calculated by said discharge air temperature difference calculation means to the target position obtained by a preceding calculation;
   (f) comparator means for comparing an output from said position detection means and an output from said target door-position calculation means; and
   (g) drive control means for controlling operation of the air-mix door according to a result of comparison by said comparator means.

2. An apparatus according to claim 1, said target discharge air temperature calculation means being operative to calculate a target discharge air temperature based on an actual set temperature, an actual detected vehicle compartment temperature and an actual detected outside air temperature.

3. An apparatus according to claim 1, said actual discharge air temperature acquirement means being operative to output a piece of data selected from stored data concerning the actual discharge air temperature experimentally collected based on detected values indicative of various positions of the air-mix door and detected values indicative of various temperatures of an evaporator of the air-conditioner.

* * * * *